United States Patent
Liu et al.

(10) Patent No.: US 10,856,204 B2
(45) Date of Patent: Dec. 1, 2020

(54) NETWORK MASTER DEVICE AND NETWORK COMMUNICATION METHOD FOR REALIZING COOPERATIVE SERVICE SET

(71) Applicant: REALTEK SEMICONDUCTOR CORPORATION, Hsinchu (TW)

(72) Inventors: Der-Zheng Liu, Hsinchu County (TW); Ming-Yuh Yeh, Taipei (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 196 days.

(21) Appl. No.: 15/871,519

(22) Filed: Jan. 15, 2018

(65) Prior Publication Data

US 2018/0338273 A1 Nov. 22, 2018

(30) Foreign Application Priority Data

May 19, 2017 (TW) .............................. 106116561 A (51) Int. Cl.
*H04W 40/02* (2009.01)
*H04W 40/22* (2009.01)
(Continued)

(52) U.S. Cl.
CPC ............. *H04W 40/02* (2013.01); *H04W 8/26* (2013.01); *H04W 40/22* (2013.01); *H04W 40/24* (2013.01);
(Continued)

(58) Field of Classification Search
CPC ..... H04W 40/02; H04W 40/22; H04W 40/24; H04W 76/15; H04W 84/20; H04W 84/22; H04W 8/26; H04W 92/10
See application file for complete search history.

(56) References Cited

U.S. PATENT DOCUMENTS

| 2002/0198813 A1* | 12/2002 | Patterson, Jr. .... H04L 29/12009 705/36 R |
| 2004/0063455 A1* | 4/2004 | Eran ................... H04J 13/0048 13/48 |

(Continued)

FOREIGN PATENT DOCUMENTS

WO   WO 2016109921 A1   7/2016

OTHER PUBLICATIONS

Taiwan Intellectual Property Office, "Office Action", dated May 31, 2018. Summary of the OA letter: References 1(WO 2016109921A1), 2 (US 2009175260A1) and 3(US 2012115523A1) render claims 1-5, 9-10 obvious.

(Continued)

*Primary Examiner* — Ajit Patel
*Assistant Examiner* — Wilfred Thomas
(74) *Attorney, Agent, or Firm* — WPAT, PC (57) ABSTRACT

The present disclosure provides a network master device and a network communication method for realizing a cooperative service set, in which the network master device and the network communication method are capable of controlling wireless serving devices to have them keep wireless connections with a wireless terminal device concurrently. An embodiment of the network master device includes a control circuit configured to execute the following steps: receiving uplink packets come from wireless serving devices respectively, and transmitting a transmission packet to an external network according to at least one of the uplink packets, in which a source address of each of the uplink packets is an address of a wireless terminal device; and transmitting at least one downlink packet to at least one of the wireless serving devices, in which a destination address of each the downlink packet is the address of the wireless terminal device.

18 Claims, 5 Drawing Sheets

(51) Int. Cl.
*H04W 76/15* (2018.01)
*H04W 92/10* (2009.01)
*H04W 84/22* (2009.01)
*H04W 84/20* (2009.01)
*H04W 8/26* (2009.01)
*H04W 40/24* (2009.01)

(52) U.S. Cl.
CPC .......... *H04W 76/15* (2018.02); *H04W 84/20* (2013.01); *H04W 84/22* (2013.01); *H04W 92/10* (2013.01)

(56) References Cited

U.S. PATENT DOCUMENTS

| | | | |
|---|---|---|---|
| 2005/0157681 A1* | 7/2005 | Tajima | H04W 36/0011 370/332 |
| 2006/0215594 A1* | 9/2006 | Shirokura | H04L 12/4633 370/328 |
| 2008/0112373 A1* | 5/2008 | Shpak | H04W 76/11 370/338 |
| 2008/0263666 A1* | 10/2008 | Keohane | H04L 63/126 726/23 |
| 2009/0175260 A1 | 7/2009 | Wang et al. | |
| 2010/0046471 A1* | 2/2010 | Hattori | H04B 7/022 370/331 |
| 2010/0189047 A1* | 7/2010 | Baum | H04B 7/024 370/329 |
| 2011/0235563 A1* | 9/2011 | Tinnakornsrisuphap | H04L 67/02 370/312 |
| 2011/0299551 A1* | 12/2011 | Fiorone | H04L 45/36 370/401 |
| 2012/0115523 A1 | 5/2012 | Shpak | |
| 2013/0010716 A1* | 1/2013 | Dinan | H04W 76/15 370/329 |
| 2013/0286814 A1* | 10/2013 | Lee | H04W 40/34 370/216 |
| 2014/0010177 A1* | 1/2014 | Wentink | H04W 8/26 370/329 |
| 2014/0105067 A1* | 4/2014 | Chen | H04W 40/02 370/254 |
| 2016/0112311 A1* | 4/2016 | Vyas | H04L 45/74 370/328 |
| 2016/0212696 A1* | 7/2016 | Tu | H04W 28/08 |
| 2018/0262432 A1* | 9/2018 | Ozen | H04L 61/2069 |

OTHER PUBLICATIONS

Wikipedia, "Multi-user MIMO" Retrieved from "https://en.wikipedia.org/w/index.php?title=Multi-user_MIMO&oldid=771621858" on Apr. 14, 2017. Last modified Mar. 22, 2017.

* cited by examiner

NETWORK MASTER DEVICE AND NETWORK COMMUNICATION METHOD FOR REALIZING COOPERATIVE SERVICE SET

BACKGROUND OF THE INVENTION

1. Field of the Invention

The present disclosure relates to a network communication system, especially to a network master device and a network communication method capable of realizing a cooperative service set.

2. Description of Related Art

Wireless networks are widely spread in the world due to their usage convenience. A general domestic network system includes a routing device (e.g., a gateway, a router, or the like) and several access points (AP). Each access point acts as the redistribution point of a basic service set (BSS) and provides a service range. A wireless terminal device (e.g., a computer, a cell phone, or the like) within the service range of an access point can establish connection with the access point and act as a client station in the BSS; after the connection is established, the wireless terminal device is allowed to surf an external network (e.g., internet) via the access point and the aforementioned routing device.

However, regarding the current art (e.g., IEEE 802.11-2016), a wireless terminal device is only allowed to connect to a single access point (hereafter, first access point) at the same time; if the wireless terminal device is going to connect to another access point (hereafter, second access point), the wireless terminal device should disconnect the connection with the first access point and then connect to the second access point even though the connection settings (e.g., service set identifier (SSID), security type, key) of the first and the second access points are the same, in which the BSS identifier (BSSID) of the first access point must be different from the BSSID of the second access point according to the regulations of the current art. Generally, the BSSID of an access point is the media access control address (MAC address) of the access point in a conventional infrastructure BSS. The above-described current art has at least the following problems:

(1) If a wireless terminal device moves back and forth between the service range provided by the first access point of a first BSS and the service range provided by the second access point of a second BSS, the wireless terminal device could frequently disconnect a current connection to establish a new connection because it frequently goes out of an original service range and enters a new service range. The above-mentioned characteristic decreases the available data communication time of the wireless terminal device and consequently lowers the data throughput of the wireless terminal device.

(2) If a wireless terminal device is in an overlapping region of the service ranges of several access points, the wireless terminal device still suffers interference from the communication signal(s) of the other access point(s) although the wireless terminal device establishes one and only connection with one of the access points. Since the disposition of access points gets more and more intensive, the interference problem gets more and more serious.

SUMMARY OF THE INVENTION

One of multiple purposes of the present disclosure is to provide a network master device and a network communication method for realizing a cooperative service set.

One of multiple purposes of the present disclosure is to provide a network master device and a network communication method for improving the throughput of a wireless communication system.

One of multiple purposes of the present disclosure is to provide a network master device and a network communication method for relieving interference in the operation of a wireless terminal device.

The present disclosure includes a network master device for realizing a cooperative service set. An embodiment of the network master device includes a control circuit. The control circuit is capable of controlling wireless serving devices that are wirelessly connected with a wireless terminal device concurrently, and the control circuit is configured to execute the following steps: receiving uplink packets via at least one service set port, and transmitting a transmission packet to an external network via an external network port according to at least one of the uplink packets, in which the uplink packets come from the wireless serving devices respectively, and a source address of each of the uplink packets is an address of the wireless terminal device; and transmitting at least one downlink packet(s) to at least one of the wireless serving devices via the at least one service set port(s) according to a reception packet from the external network, in which a destination address of each of the at least one downlink packet is the address of the wireless terminal device.

The present disclosure further includes a network communication method for realizing a cooperative service set. An embodiment of the network communication method includes the following steps: using a network master device to control wireless serving devices that are wirelessly connected with a wireless terminal device concurrently; using the network master device to receive uplink packets; using the network master device to transmit a transmission packet to an external network according to at least one of the uplink packets, in which the uplink packets come from the wireless serving devices respectively, and a source address of each of the uplink packets is an address of the wireless terminal device; and using the network master device to transmit at least one downlink packet(s) to at least one of the wireless serving devices according to a reception packet from the external network, in which a destination address of each of the at least one downlink packet(s) is the address of the wireless terminal device.

These and other objectives of the present disclosure will no doubt become obvious to those of ordinary skill in the art after reading the following detailed description of the embodiments that are illustrated in the various figures and drawings.

DETAILED DESCRIPTION OF THE
EMBODIMENTS

The present disclosure includes a network master device and a network communication method capable of controlling a plurality of wireless serving devices and having these wireless serving devices wirelessly connect to a wireless terminal device concurrently (i.e., having these wireless serving devices keep wireless connection with the wireless terminal device concurrently), so as to realize a cooperative service set (CSS). The service range of the CSS is broader than the service range of each of the wireless serving devices alone, that is, the service range of the CSS is union of the service range of each of the wireless serving devices. In some embodiments, the aforementioned network master device is a device, such as a routing device (e.g., a gateway, a router, or the like) or the equivalent thereof, including the function of a network layer defined by Open System Interconnection (OSI); each of the aforementioned wireless serving devices is a device being workable in the embodiments of the present disclosure without having/using a circuit pertaining to a layer equal to or higher than the network layer defined by OSI, or each of the wireless serving devices is a device being workable without having/using a circuit pertaining to a layer equal to an upper layer of a data link layer defined by OSI or pertaining to a layer higher than the data link layer; each of the wireless serving devices could be an access point or the equivalent thereof with/without a function of Multiple-Input Multiple Output (MIMO); and the aforementioned wireless terminal device is an electronic device (e.g., a computer, a cell phone, or the like) having a wireless network function with/without a function of MIMO.

Figure 1:
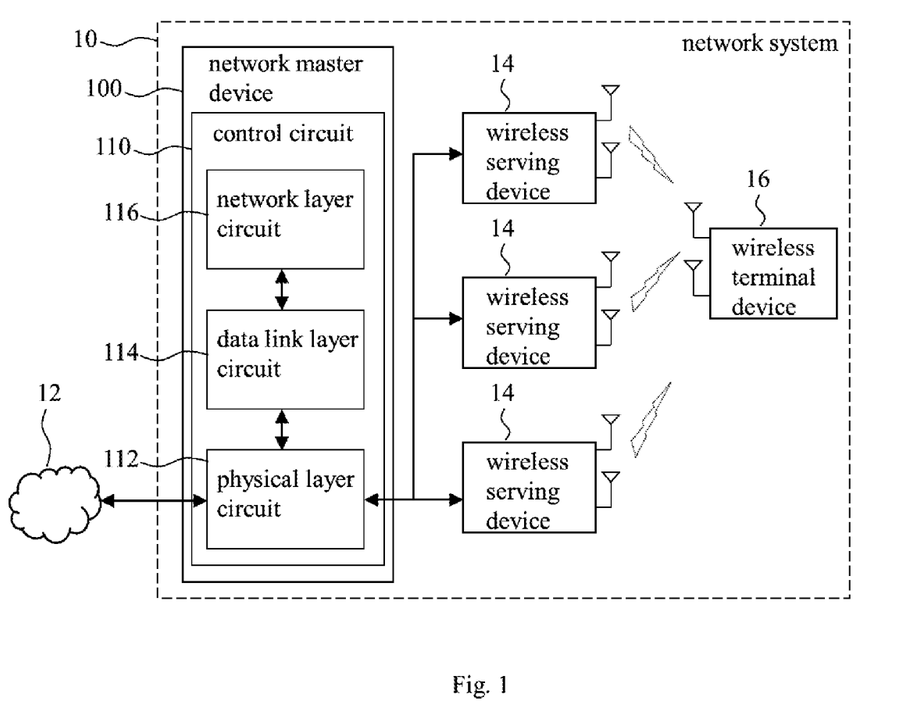
FIG. 1 shows a network system including a network master device according to an embodiment of the present disclosure.

FIG. 1 shows a network system 10 including a network master device 100 according to an embodiment of the present disclosure. The network system 10 of FIG. 1 connects to an external network 12 (e.g., internet or a local area network), and includes the network master device 100, a plurality of wireless serving devices 14, and a wireless terminal device 16. The network master device 100 includes a control circuit (a.k.a. a media layers circuit) 110. The control circuit 110 includes a physical layer circuit 112, a data link layer circuit 114, and a network layer circuit 116 which respectively carry out the function of a physical layer, the function of a data link layer and the function of a network layer defined by OSI. Generally, the data link layer circuit 114 includes a medium access control (MAC) circuit. The network layer circuit 116 includes a processor which is configured with Complex Instruction Set Computing (CISC) or Reduced Instruction Set Computing (RISC) or is an application-specific integrated circuit (ASIC). The general functions of the above-mentioned physical layer, data link layer and network layer of OSI, the MAC circuit, and CISC and RISC are known in this industrial field, and thus their detail is omitted here.

Figure 2:
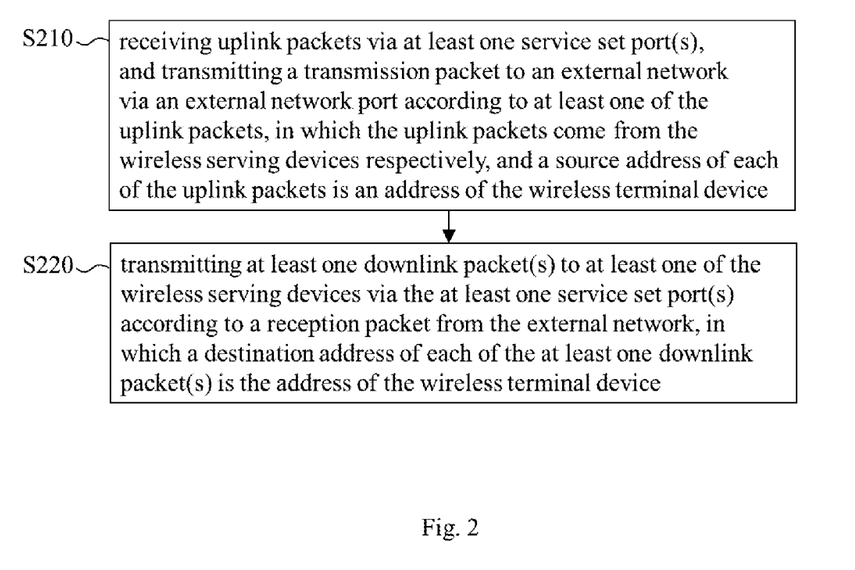
FIG. 2 shows an embodiment of the steps carried out by the control circuit of FIG. 1.

FIG. 2 shows an embodiment of the steps carried out by the control circuit 110 of FIG. 1. The steps include:

S210: receiving a plurality of uplink packets via at least one service set port, and transmitting a transmission packet to an external network 12 via an external network port (e.g., a wide area network (WAN) port) according to at least one of the uplink packets, in which the uplink packets come from the wireless serving devices 14 respectively (i.e., each wireless serving device 14 transmits one of the uplink packets while the rest of the uplink packet(s) is/are transmitted by the other wireless serving device(s) 14), and a source address of each of the uplink packets is an address (e.g., MAC address) of the wireless terminal device 16.

In step S210, an embodiment of the at least one service set port(s) (e.g., N service set port(s)) includes at least one Ethernet ports (e.g., N Ethernet port(s)), and another embodiment of the at least one service set ports includes a known communication port (e.g., Token Bus) or a self-developed high-speed communication port. The at least one service set port can be a single port or a plurality of ports. The control circuit 110 connects to the wireless serving devices 14 via the single port/the plurality of ports respectively, so as to receive the uplink packets from the wireless serving devices 14 substantially at the same time (characterized in that the time difference of receiving different packets is less than a predetermined threshold, exceeds a capability of circuit detection, or meaningless in physics) or at different times, in which the connection between the network master device 100 and the wireless serving devices 14 is wired connection (e.g., using an optical fiber, a coaxial cable, or a twisted-pair cable) which is exemplary for understanding rather than restrictive for the embodiments of the present disclosure. In some embodiments, the connection between the network master device 100 and the wireless serving devices 14 is wireless connection. The uplink packets originate from the same original uplink packet transmitted by the wireless terminal device 16, and the content of the data field of each uplink packet includes/is equal to the whole content of the data field of the original uplink packet (e.g., each uplink packet equivalent to the original uplink packet) or the content of the data field of each uplink packet includes partial content of the data field of the original uplink packet. The control circuit 100 uses at least one of the techniques including packet synchronization, packet assembly, error correction for multiple packets and packet selection to generate the transmission packet according to at least one of the uplink packets, in which the content of the data field of the transmission packet includes/is equal to the whole content of the data field of the original uplink packet. Regarding the above-mentioned packet synchronization, in an embodiment, the control circuit 110 transmits an uplink control signal (e.g., a synchronization signal, an interrupt signal, or a polling signal) to each wireless serving device 14, and the uplink control signal allows these wireless serving devices 14 to transmit the uplink packets substantially at the same time or at different times. Regarding the above-mentioned packet assembly, the MAC circuit included in the data link layer circuit 114 is capable of assembling the uplink packets according to the header information (e.g., the fragment offset in the header information). Regarding the above-mentioned packet selection, in an embodiment, the control circuit 110 selects one of the uplink packets (e.g., the uplink packet correctly received at the earliest) according to a predetermined rule, so as to generate the transmission packet. In an embodiment, the uplink packets are identical and transmitted concurrently, and received by the MAC circuit of the data link layer circuit 114 via the same port. As a result, in consideration of the synthesis of signal energy, these uplink packets which are concurrently transmitted can be formed as an enhanced uplink packet which is favorable for being received correctly. In another embodiment, the uplink packets are received by the MAC circuit of the data link layer circuit 114 via different ports and stored temporarily; as a result, error correction can be carried out in accordance with more received information, and thereby a ratio of successful transmission can be increased (i.e., a retransmission count can be reduced).

S220: transmitting at least one downlink packet to at least one of the wireless serving devices 14 via the at least one service set port according to a reception packet from the external network 12, in which a destination address of each of the at least one downlink packet is the address of the wireless terminal device 16.

In this step, the at least one service set port can be a single port or a plurality of ports, and the MAC circuit of the data link layer circuit 114 respectively connects to the wireless serving devices 14 via the single port/the plurality of ports so as to transmit the at least one downlink packet to the wireless serving devices 14 substantially at the same time or at different times. The content of the data field of each downlink packet includes/is equal to the whole content of the data field of the reception packet. Each wireless serving device 14 which receives the downlink packet forwards the downlink packet to the wireless terminal device 16, or each wireless serving device 14 which receives the downlink packet is controlled by a downlink control signal (e.g., a synchronization signal, an interrupt signal, or a polling signal) from the network master device 100 to forward the downlink packet to the wireless terminal device 16 substantially at the same time or at different times. In an embodiment, when the at least one downlink packet includes a plurality of identical packets, under the control of the network master device 100, the wireless serving devices 14 concurrently transmit these identical packets to the wireless terminal device 16 in accordance with their respective transmission parameters (e.g., channel matrix, signal gain, noise cancellation, and/or the like). As a result, in consideration of the synthesis of signal energy, the wireless terminal device 16 receives an enhanced downlink packet which is more favorable for the wireless terminal device 16 to correctly receive the downlink packet.

Figure 3A:
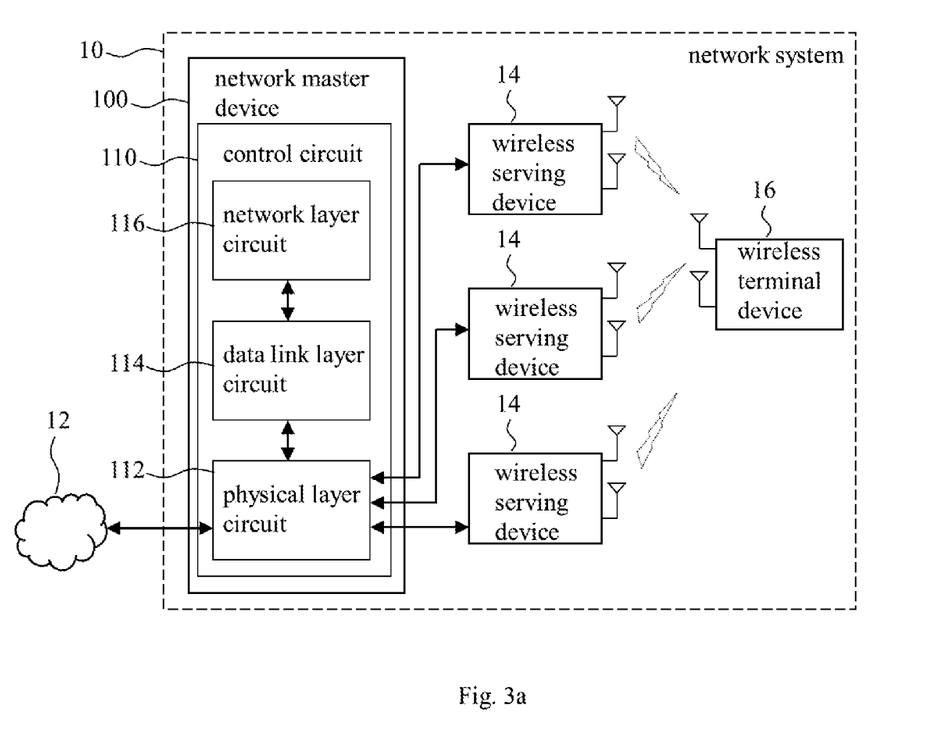
FIG. 3a shows the connections between a network master device and wireless serving devices according to an embodiment of the present disclosure.
Figure 3B:
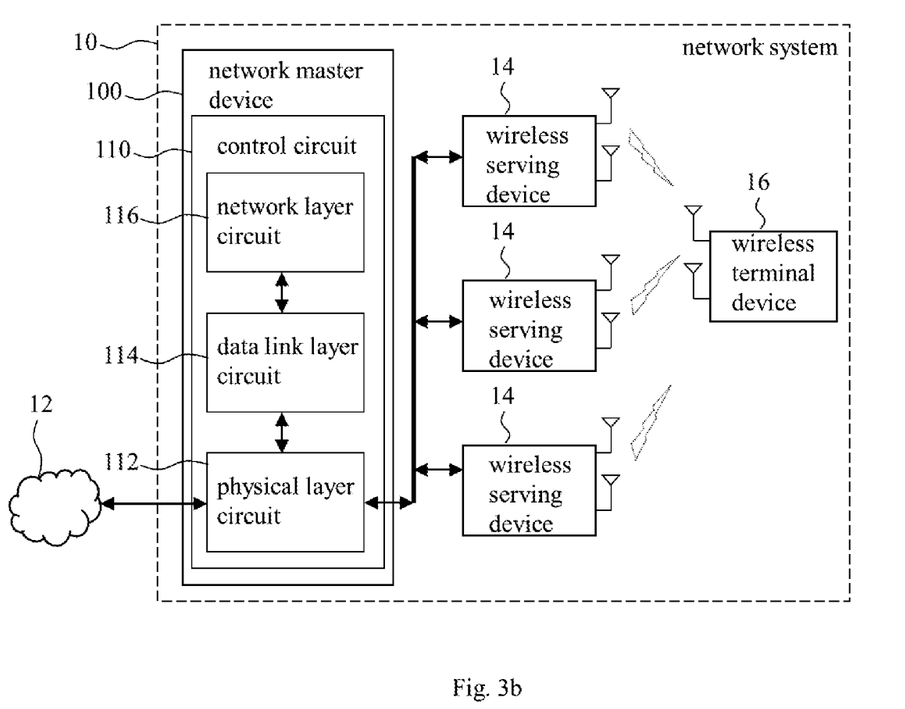
FIG. 3b shows the connections between a network master device and wireless serving devices according to another embodiment of the present disclosure.

In an embodiment, the basic service set identifiers (BSSIDs) (or the MAC addresses) of the wireless serving devices 14 are identical, and their connection setting (e.g., service set identifiers (SSID), security types, keys) are also identical; as a result, the wireless terminal device 16 treats these wireless serving devices 14 as one device, and thus these wireless serving devices 14 can constitute the aforementioned cooperative service set under the control of the network master device 100 and provide a broader service range for the wireless terminal device 16. In the above embodiment, the transmission operation between the wireless terminal device 16 and each of the wireless serving devices 14 is similar to the current art, and the transmission operation between each of the wireless serving devices 14 and the network master device 100 is similar to the current art. In detail, as shown in FIG. 3a, when the connection path between each wireless serving device 14 and the network master device 100 is dedicated to this connection (while the at least one service set port is composed of a plurality of ports), the transmission operation between each wireless serving device 14 and the network master device 100 is the same as a current art (e.g., IEEE 802.3), or the same as the current art except the transmission operation carried out under the control of the aforementioned uplink/downlink control signal. In addition, as shown in FIG. 3b, when all the wireless serving devices 14 share the same connection path to connect to the network master device 100 (while the at least one service port is a single port and the transmission operation between the wireless serving devices 14 and the MAC circuit is similar to the transmission operation using a bus), the transmission operation between each wireless serving device 14 and the network master device 100 is different from the current art with respect to the transmission operation carried out under the control of the aforementioned uplink/downlink control signal. It should be noted that when each wireless serving device 14 is only responsible for transmitting partial content of the aforementioned original uplink packet, which means that the whole content of the original uplink packet is distributed to the uplink packets transmitted by the wireless serving devices 14, the content of the uplink packet transmitted by each wireless serving device 14 is allocated according to a predetermined allocation manner or by the network master device 100. Subsequently, the network master device 100 assembles the uplinks packets come from the wireless serving devices 14 to recover the whole content of the original uplink packet.

In an embodiment, the BSSIDs (or MAC addresses) of the wireless serving devices 14 are different, and the connection setting (e.g., SSIDs, keys) are different or the same. However, these wireless serving devices 14 are associated/labeled with a community identifier (community ID) or capable of recognizing the community ID, in which the community ID can be a group ID, a color bit, a partial ID, the address of the wireless terminal device 16, etc. Therefore, regarding the uplink transmission, by having the aforementioned original uplink packet include the community ID, the wireless serving devices 14 receive and process the original uplink packet according to the community ID and then generate the aforementioned uplink packets. Regarding the downlink transmission, the wireless terminal device 16 is able to receive the aforementioned at least one downlink packet, no matter what wireless serving device 14 does the at least one downlink packet comes from, as long as the destination address of the at least one downlink packets is the address of the wireless terminal device 16. On the basis of the above, even though the wireless terminal device 16 treats the wireless serving devices 14 as different devices, these wireless serving devices 14 can constitute the aforementioned cooperative service set under the control of the network master device 100. In this embodiment, the transmission operation between the wireless terminal device 16 and each wireless serving device 14 can be achieved by the current art (e.g., IEEE 802.11), and the transmission operation between each wireless serving device 14 and the network master device 100 is similar to the current art (e.g., IEEE 802.3, IEEE 802.4). In detail, when the connection path between each wireless serving device 14 and the network master device 100 is dedicated to this connection (as shown in FIG. 3a), the transmission operation between each wireless serving device 14 and the network master device 100 is the similar to the current art, or is the similar to the current art except the transmission operation carried out under the control of the aforementioned uplink/downlink control signal. When all the wireless serving devices 14 share the same connection path to connect to the network master device 100 (as shown in FIG. 3b), the transmission operation between each wireless serving device 14 and the network master device 100 is different from the current art with respect to the transmission operation carried out under the control of the aforementioned uplink/downlink control signal.

In an embodiment, the transmission operation between each wireless serving device 14 and the network master device 100 can be achieved by WIFI (IEEE 802.11) techniques, while the transmission operation between the network master device 100 and the external network can be achieved by Ethernet (IEEE 802.3) techniques. In the above embodiment, the physical layer circuit 112 includes a WIFI physical layer circuit and an Ethernet physical layer circuit, the data link layer circuit 114 includes a WIFI MAC circuit and an Ethernet MAC circuit, and the network layer circuit 116 includes a processor capable of processing the conversion from a WIFI protocol to an Ethernet protocol and vice versa.

In an embodiment, the transmission operation between each wireless serving device 14 and the network master device 100 is achieved by Ethernet (IEEE 802.3) techniques, while the transmission operation between the network master device 100 and the external network is achieved with Digital Subscriber Line (DSL) techniques. In the above embodiment, the physical layer circuit 112 includes an Ethernet physical layer circuit and a DSL physical layer circuit, the data line layer circuit 114 includes an Ethernet MAC circuit and a DSL MAC circuit, and the network layer circuit 116 includes a processor capable of processing the conversion from an Ethernet protocol to a DSL protocol and vice versa.

In an embodiment, the MAC addresses of the wireless serving devices 14 are different; however, by the control of the network master device 100 and/or user's setting, the wireless serving devices 14 report the same device information (e.g., pseudo MAC address, DEVICE ID, BSSID, SSID) to the wireless terminal device 16, so as to allow the wireless terminal device 16 to treat the wireless serving devices 14 as one device. Regarding the above embodiment, the transmission operation between devices can be derived from the disclosure of the aforementioned embodiments.

In an embodiment, the control circuit 110 selects at least one of the wireless serving devices 14 as at least one main network device according to connection-state reports coming from the wireless serving devices 14 respectively (e.g., selecting one or more wireless serving devices 14 having better connection states with respect to the connections with the wireless terminal device 16, and then treating the selected wireless serving device(s) 14 as the main network device(s)), and the control circuit 110 transmits the aforementioned at least one downlink packet to the at least one main network device via the at least one service set port and receives the aforementioned uplink packet(s) via the at least one service set port. An instance of the above-mentioned connection-state reports includes the signal strength, distance, transmission rate, modulation and coding scheme, etc. of the wireless terminal device 16 estimated/determined by each wireless serving device 14.

In an embodiment, the control circuit 110 allocates available resources according to a predetermined rule and/or the connection-state reports of the wireless serving devices 14, so as to determine the transmission channel (e.g., a channel defined by an IEEE 802.11 standard), the transmission band (e.g., a band defined by an IEEE 802.11 standard), etc. for the connection between each/at least one wireless serving device 14 and the wireless terminal device 16, and thereby use the transmission resources in an efficient way.

In an embodiment, the aforementioned communication port (e.g., each of the at least one service set port, the external network port) is a physical port. In another embodiment, the aforementioned communication port is a logical port designated and managed by the network master device 100.

It should be noted that although the aforementioned embodiments are illustrated with one wireless terminal device, the present invention is applicable to a network system including a plurality of wireless terminal devices. When the cooperative service set of the present disclosure includes a plurality of wireless terminal devices, the operation of each of the wireless terminal devices is the same as or similar to the operation of the aforementioned wireless terminal device 16; under the control of the aforementioned network master device, each of the aforementioned wireless serving devices communicates with the wireless terminal devices at the same time/at different times according to its transmission parameter(s) (e.g., communication matrix, signal gain, noise cancellation); the network master device is capable of calculating and providing the above-mentioned transmission parameter(s) according to the connection-state report of each wireless serving device. And when the wireless serving devices and the wireless terminal devices communicate concurrently, the existing techniques of Multi-User Multiple-Input Multiple Output (MU-MIMO) and/or Multi-User to Multi-User can be introduced to realize such concurrent communication. In addition, the current MIMO techniques can be optionally introduced to realize any of the embodiments of the present disclosure.

It should be noted that, provided an implementation is practicable, people of ordinary skill in the art can carry out this implementation by introducing some or all feature(s) of any embodiment of the present disclosure or by introducing some or all features of several embodiments of the present disclosure, so as to accomplish the present invention flexibly.

Figure 4:
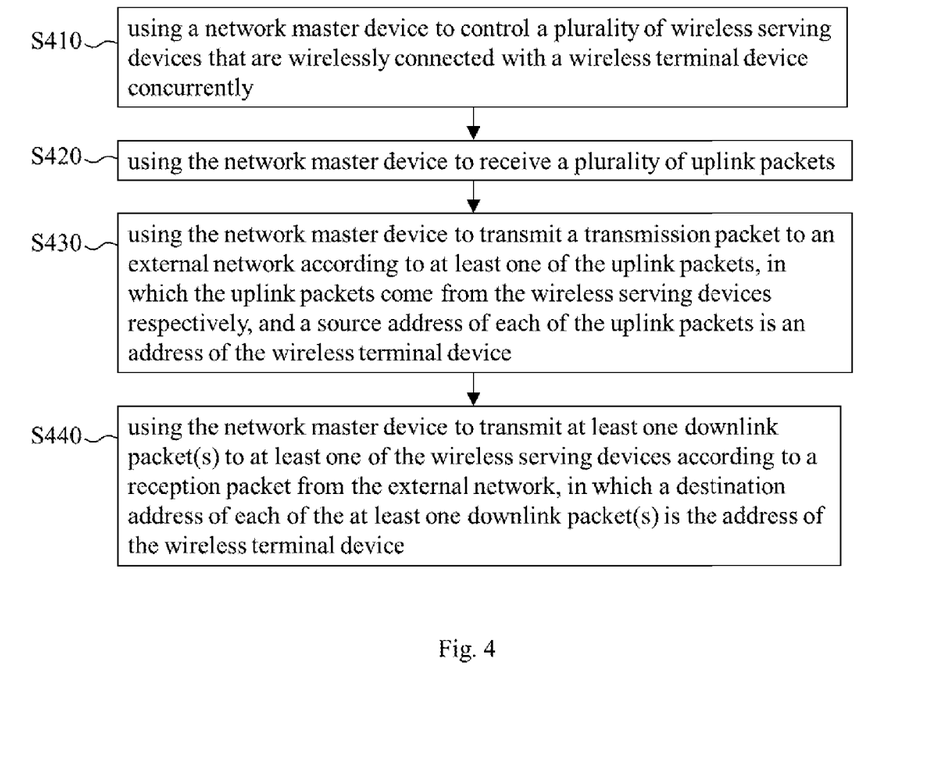
FIG. 4 shows a network communication method according to an embodiment of the present disclosure.

FIG. 4 shows a network communication method for realizing a cooperative service set according to an embodiment of the present disclosure. The method of FIG. 4 includes the following steps:

S410: using a network master device to control a plurality of wireless serving devices that are wirelessly connected with a wireless terminal device concurrently;

S420: using the network master device to receive a plurality of uplink packets;

S430: using the network master device to transmit a transmission packet to an external network according to at least one of the uplink packets, in which the uplink packets come from the wireless serving devices respectively, and a source address of each of the uplink packets is an address of the wireless terminal device; and S440: using the network master device to transmit at least one downlink packet(s) to at least one of the wireless serving devices according to a reception packet from the external network, in which a destination address of each of the at least one downlink packet is the address of the wireless terminal device.

Since those of ordinary skill in the art can appreciate the detail and the modification of the method embodiment by referring to the aforementioned device embodiments of the present disclosure, which means that each feature of the device embodiments can be applied to the method embodiment in a reasonable way, repeated and redundant description is hereby omitted provided that the written description and the enablement requirements for the method embodiment is still fulfilled.

To sum up, the network master device and the network communication method of the present disclosure can control a plurality of wireless serving devices to have these wireless serving devices wirelessly connect to a wireless terminal device concurrently (i.e., having the wireless serving devices keep wireless connection with the wireless terminal device at the same time), and thereby realize a cooperative service set having a broader service range for serving the wireless terminal device.

The aforementioned descriptions represent merely the embodiments of the present disclosure, without any intention to limit the scope of the present invention thereto. Various equivalent changes, alterations, or modifications based on the claims of present invention are all consequently viewed as being embraced by the scope of the present invention.

What is claimed is:

1. A network device for realizing a cooperative service set, comprising:
   at least one service set port;
   a network port;
   a control circuit, for controlling a first wireless serving device and a second wireless serving device, wherein the first wireless serving device and the second wireless serving device are wirelessly connected with a wireless terminal device with a first terminal address concurrently;
   wherein the control circuit executes following steps:
      receiving a first uplink packet and a second uplink packet via the at least one service set port, wherein the first uplink packet has a first source address and is from the first wireless serving device, the second uplink packet has the first source address and is from the second wireless serving device, and the first source address equals to the first terminal address;
      using at least the first uplink packet and the second uplink packet to generate a transmission packet;
      transmitting the transmission packet to an external network via the network port; and
      transmitting at least one downlink packet to the first wireless serving device via the at least one service set port according to a reception packet from the external network, wherein a destination address of the at least one downlink packet is the first terminal address.

2. The network device of claim 1, wherein basic service set identifiers of the wireless serving devices are identical.

3. The network device of claim 1, wherein basic service set identifiers of the wireless serving devices are different.

4. The network device of claim 1, wherein each of the uplink packets includes partial content of the transmission packet.

5. The network device of claim 1, wherein the control circuit transmits the at least one downlink packet to the wireless serving devices via the at least one service set port respectively 1.

6. The network device of claim 1, wherein the network device controls the wireless serving devices through wired connection.

7. The network device of claim 1, wherein the control circuit transmits the at least one downlink packet to at least one of the wireless serving devices via one or more of multiple ports of the at least one service set port, and the control circuit controls the wireless serving devices respectively via the multiple ports.

8. The network device of claim 1, wherein the control circuit transmits an uplink control signal to the wireless serving devices respectively, and the uplink control signal allows the wireless serving devices to transmit the uplink packets.

9. The network device of claim 1, wherein the control circuit selects at least one of the wireless serving devices as at least one main network device according to connection-state reports coming from the wireless serving devices respectively, and the control circuit transmits the at least one downlink packet to the at least one main network device via the at least one service set port.

10. The network device of claim 1, wherein each of the wireless serving devices communicates with the network device and the wireless terminal device without using a circuit pertaining to a layer equal to or higher than a network layer defined by Open System Interconnection (OSI).

11. The network device of claim 1, wherein each of the wireless serving devices communicates with the network device and the wireless terminal device without using a circuit pertaining to a first layer equal to an upper layer of a data link layer defined by Open System Interconnection (OSI) or pertaining to a second layer higher than the data link layer.

12. A network communication method for realizing a cooperative service set, comprising following steps:
   using a network device to control a first wireless serving device and a second wireless serving device, wherein the first wireless serving device and the second wireless serving device are wirelessly connected with a wireless terminal device with a first terminal address concurrently;
   using the network device to receive a first uplink packet and a second uplink packet, wherein the first uplink packet has a first source address and is from the first wireless serving device, the second uplink packet has the first source address and is from the second wireless serving device, and the first source address equals to the first terminal address;
   using the network device to generate a transmission packet based on at least the first uplink packet and the second uplink packet;
   using the network device to transmit the transmission packet to an external network; and
   using the network device to transmit at least one downlink packet to the first wireless serving device according to a reception packet from the external network, wherein a destination address of the at least one downlink packet is the first terminal address.

13. The network communication method of claim 12, wherein media access control addresses of the wireless serving devices are identical.

14. The network communication method of claim 12, wherein the uplink packets originate from an original uplink packet of the wireless terminal device, the original uplink packet includes a community identifier allowing the wireless serving devices to receive the original uplink packet and accordingly generate the uplink packets.

15. The network communication method of claim 12, wherein each of the uplink packets includes partial content of the transmission packet.

16. The network communication method of claim 12, wherein the step of transmitting the at least one downlink packet comprises:
   transmitting packets of the at least one downlink packet to the wireless serving devices respectively, in which the packets of the at least one downlink packet are identical.

17. The network communication method of claim 12, further comprising:
  using the network device to transmit an uplink control signals to the wireless serving devices respectively, in which the uplink control signals allow the wireless serving devices to transmit the uplink packets.

18. The network communication method of claim 12, further comprising:
  selecting, by the network device, at least one of the wireless serving devices as at least one main network device according to connection-state reports coming from the wireless serving devices respectively, so as to have the network device transmit the at least one downlink packet to the at least one main network device.

\* \* \* \* \*